United States Patent
Ohara et al.

(10) Patent No.: US 10,125,025 B2
(45) Date of Patent: *Nov. 13, 2018

(54) METHOD FOR PRODUCING HEMATITE FOR IRONMAKING

(71) Applicant: SUMITOMO METAL MINING CO., LTD., Tokyo (JP)

(72) Inventors: Go Ohara, Tokyo (JP); Yasumasa Kan, Tokyo (JP); Masaki Imamura, Tokyo (JP)

(73) Assignee: Sumitomo Metal Mining Co. Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/121,403

(22) PCT Filed: Jan. 30, 2015

(86) PCT No.: PCT/JP2015/052713
§ 371 (c)(1),
(2) Date: Aug. 25, 2016

(87) PCT Pub. No.: WO2015/129385
PCT Pub. Date: Sep. 3, 2015

(65) Prior Publication Data
US 2016/0362304 A1  Dec. 15, 2016

(30) Foreign Application Priority Data

Feb. 27, 2014  (JP) ................. 2014-036474

(51) Int. Cl.
*C01G 49/00* (2006.01)
*C01G 49/06* (2006.01)
(Continued)

(52) U.S. Cl.
CPC .............. *C01G 49/06* (2013.01); *C22B 1/16* (2013.01); *C22B 3/08* (2013.01); *C22B 3/22* (2013.01);
(Continued)

(58) Field of Classification Search
CPC .. C01G 49/06; C22B 3/08; C22B 3/44; C22B 3/22; C22B 23/043; Y02P 10/234
(Continued)

(56) References Cited

U.S. PATENT DOCUMENTS 5,453,253 A    9/1995  Von Roepenack et al.
9,828,256 B2 * 11/2017  Ohara .................... C01G 49/06
(Continued)

FOREIGN PATENT DOCUMENTS

AU    2005248187    12/2005
AU    2009212947    4/2010
(Continued)

OTHER PUBLICATIONS

International Search Report.

*Primary Examiner* — Steven J Bos
(74) *Attorney, Agent, or Firm* — Gerald E. Hespos; Michael J. Porco; Matthew T. Hespos

(57) ABSTRACT

There is provided a method for producing (high purity) hematite for ironmaking, in a process where a mineral acid and an oxidizing agent are added to an ore containing iron and a valuable metal and then the valuable metal is leached under high temperatures and high pressures, comprises the steps of: (1) a high pressure leach step; (2) a preliminary neutralization step; (3) a solid-liquid separation step 1; (4) a neutralization step 1; (5) a neutralization step 2; (6) a solid-liquid separation step 3; (7) seed crystal addition treatment; (8) a solid-liquid separation step 2; and (9) a firing step.

9 Claims, 2 Drawing Sheets

(51) Int. Cl.
*C22B 1/16* (2006.01)
*C22B 3/44* (2006.01)
*C22B 3/00* (2006.01)
*C22B 3/08* (2006.01)
*C22B 3/22* (2006.01)

(52) U.S. Cl.
CPC .............. *C22B 3/44* (2013.01); *C22B 23/043* (2013.01); *C22B 23/0415* (2013.01); *Y02P 10/234* (2015.11)

(58) Field of Classification Search
USPC .............................................. 423/633, 150.1
See application file for complete search history.

(56) References Cited

U.S. PATENT DOCUMENTS

| | | | |
|---|---|---|---|
| 2005/0265910 A1* | 12/2005 | Kobayashi | C22B 23/043 423/140 |
| 2009/0148366 A1 | 6/2009 | Roche et al. | |
| 2010/0018350 A1* | 1/2010 | Shibayama | C22B 23/043 75/743 |
| 2015/0023851 A1 | 1/2015 | Sasaki et al. | |
| 2015/0050200 A1 | 2/2015 | Sasaki et al. | |
| 2015/0050201 A1 | 2/2015 | Ozaki et al. | |

FOREIGN PATENT DOCUMENTS

| | | | |
|---|---|---|---|
| AU | 2013383668 | | 10/2015 |
| CA | 2867672 | * | 9/2013 |
| JP | 3-176081 | | 7/1991 |
| JP | 2004-225120 | | 8/2004 |
| JP | 4294685 | | 4/2009 |
| JP | 2009-520661 | | 5/2009 |
| JP | 2010-95788 | | 4/2010 |
| JP | 2013-193923 | | 9/2013 |
| JP | 2013-193928 | | 9/2013 |
| JP | 2013-194283 | | 9/2013 |
| JP | 2014-189412 | | 10/2014 |
| JP | 5800255 | | 9/2015 |

* cited by examiner

METHOD FOR PRODUCING HEMATITE FOR IRONMAKING

BACKGROUND

1. Field of the Invention.

The present invention relates to a method for producing hematite for ironmaking. Particularly, the present invention relates to a method for producing hematite for ironmaking which can efficiently suppress the mixing of a sulfur compound into a leach residue in real operation by providing a plural series of solid-liquid separation steps in the hydrometallurgical process of nickel oxide ore.

2. Description of the Related Art.

Nickel has been widely used as a raw material of stainless steel.

However, with a tendency of depletion of a sulfide ore as a raw material of nickel, a technique of refining low-grade oxide ore has been developed and put into practical use.

Specifically, a production process called "high pressure acid leach (HPAL)" has been put into practical use, in which nickel oxide ore such as limonite and saprolite is put in a pressure device such as an autoclave together with a sulfuric acid solution, and nickel is leached under a high temperature of about 240 to 260° C. and high pressure.

To a solution containing nickel leached into the sulfuric acid solution, is added a neutralizing agent to neutralize excess acid, and then the resulting mixture is subjected to solid-liquid separation to separate nickel from a leach residue. Subsequently, impurities are separated to recover nickel as an intermediate material in the form of hydroxide, sulfide, or the like. The intermediate material is further refined to thereby obtain nickel metal, a nickel salt compound, or the like.

Note that in the preliminary neutralization step of neutralizing the excess acid, the solution is adjusted to a pH suitable for solid-liquid separation, and in the next step of solid-liquid separation step, the concentration of solids and solid-liquid separation are performed in a facility called CCD (Counter Current Decantation). Generally, a plurality of successive stages of thickeners are used in CCD.

A liquid component (hereinafter may be referred to as an overflow) obtained from the CCD is transferred to a neutralization step so as to be adjusted to a pH suitable for a sulfurization step, and fine solids produced by adjusting pH are removed by precipitation. Then, the resulting liquid component is generally sent, for example, to the sulfurization step to be subjected to sulfurization treatment to produce an intermediate material, that is, a mixed sulfide of nickel and cobalt.

In this case, Japanese Patent Laid-Open No. 2004-225120, for example, describes a technique of adding a part of solids obtained by CCD (hereinafter may be referred to as an underflow) to the neutralization step as seed crystals to accelerate the production of fine precipitates, and the technique is effectively utilized to improve the efficiency of real operation.

In such a production process called high pressure acid leach (HPAL), nickel can be leached substantially completely, for example in the case of nickel oxide ore, even if the ore is a low grade ore containing a target valuable metal to be recovered in an amount of 1 to 2% by weight or less (hereinafter, the grade is represented by "%").

Further, by producing an intermediate material from a leachate, a target metal can be obtained by concentrating the target metal to the same degree as in a conventional raw material and employing substantially the same refining method and steps as for a conventional raw material.

Further, the HPAL process can be applied not only to nickel oxide ore but to various ores such as nickel sulfide ore, copper sulfide ore, and copper oxide ore.

Further, the main component of the leach residue obtained by the HPAL process is iron oxide in the form of hematite and the like. The content of iron in the leach residue is about 50%, and the production volume of the leach residue is about 50 times to 100 times the production volume of the intermediate material. This is because the nickel oxide ore and the copper sulfide ore used as raw materials contain iron in an amount far exceeding the content of nickel and copper, respectively.

The leach residue is in the form of a chemically and environmentally stable oxide since it is produced at high temperatures, but under the present circumstances, it does not have particular utility value and is accumulated and stored in a residue stacking yard.

Therefore, a wide residue stacking yard is required for accumulating and storing a huge amount of leach residue produced with the operation of the HPAL process.

On the other hand, in steel smelting, there is used a method including charging iron ore containing iron oxide into a blast furnace together with a reducing agent such as coke, heating the iron ore to reduce and melt it to obtain crude steel, and refining the crude steel in a converter to produce target steel.

Iron oxide as the raw material is limited resources, and, moreover, it is increasingly difficult to acquire good quality iron ore required for maintaining the quality of steel. Therefore, investigation of using the leach residue as iron ore has been made.

However, it has been unable to directly use the leach residue from the HPAL process for a raw material for ironmaking.

The reason includes the following two points.

(1) Since the leach residue from the HPAL process contains vein stone and impurities, particularly sulfur in addition to iron oxide, it has not been suitable as a raw material used for conventional common ironmaking processes.

(2) The average particle size of hematite recovered from the leach residue is as very fine as 1 µm or less, and its handling is difficult.

Incidentally, the iron ore can be classified into lump ore (6.3 to 31.5 mm), powder ore (1 to 6.3 mm), and fine powder ore (0.05 to 0.1 mm), and the raw material for ironmaking which is charged into a blast furnace includes three types, that is, lump ore, sintered ore, and pellet.

Note that sintered ore is produced by sintering powder ore, and pellet is obtained by baking fine powder ore.

The sulfur impurity in the iron oxide that can be utilized as a raw material for ironmaking, which is different depending on the equipment capacity of each iron mill, production volume, and the like, is generally required to be suppressed to less than 1%.

On the other hand, the leach residue from the HPAL process normally contains about 5 to 8% of sulfur.

Most of the sulfur in the leach residue is derived from calcium sulfate (gypsum) mixed during nickel refining.

When free sulfuric acid (free sulfuric acid means sulfuric acid remaining unreacted in the sulfuric acid excessively added to perform sufficient leaching in the HPAL process) remaining in the leach slurry obtained in high pressure acid leach is neutralized, a neutralizing agent that is common, inexpensive, and calcium-based, for example, limestone or slaked lime, is added. The gypsum is produced by the reaction between the calcium contained in the neutralizing agent and the free sulfuric acid and mixed into the leach residue.

Note that a part of sulfur (about 1%) contained in the leach residue is incorporated into hematite particles produced.

Therefore, it is considered preferable to use a neutralizing agent as an additive which is not an agent forming a poorly soluble precipitate after neutralization, such as limestone or slaked lime, but an agent producing a soluble salt.

Examples of neutralizing agents suitable for such application include sodium hydroxide, potassium hydroxide, magnesium hydroxide, and magnesium oxide.

However, these neutralizing agents are not suitable for the process of consuming a large amount of neutralizing agents, such as the HPAL process, because these neutralizing agents are expensive or produced in a small amount.

Therefore, since it is forced to use, totally or partially, the calcium-based neutralizing agent which forms a poorly soluble precipitate after neutralization as described above and the mixing of sulfur cannot be avoided, it has not been possible to process the leach residue produced in the HPAL process into hematite to be used as a raw material for ironmaking.

On the other hand, there is also known a method of using a pressure device such as an autoclave to separate sulfur in jarosite.

For example, Japanese Patent Laid-Open No. H03-176081 discloses a method comprising stirring a jarosite-containing residue and a zinc sulfide-containing concentrate in an autoclave at an oxygen partial pressure of at least 1000 kPa and a temperature of 130 to 170° C. together with 40 to 100 g/L of free sulfuric acid to substantially dissolve iron and zinc in the residue and the zinc sulfide-containing concentrate, introducing the resulting solution into a leach circuit for zinc electrolysis to precipitate iron in the form of hematite to separate sulfur from the solids, and supplying the residue to another application.

However, this method requires an expensive new device such as an autoclave and an increase in equipment cost, and has had a problem also in productivity.

Therefore, the use of magnesium oxide that is contained in the ore itself as a neutralizing agent has been proposed.

For example, Japanese Patent Laid-Open No. H03-176081 discloses a process of recovering magnesium oxide from a source of magnesium sulfate, the process including the steps of: providing a source of magnesium sulfate in solution that is derived from part of a process associated with the leaching of a metal containing ore or concentrate; converting the magnesium sulfate in solution to solid magnesium sulfate; contacting the solid magnesium sulfate with elemental sulfur in a reducing atmosphere; and recovering magnesium as magnesium oxide, and sulfur as sulfur dioxide gas.

By using this method, the magnesium contained in the ore can be reused as a neutralizing agent, and calcium to be incorporated can be suppressed. As a result, calcium that is mixed into the iron oxide in the residue can be reduced.

However, the method of Patent Literature 3 requires a large amount of heat for crystallizing magnesium in the solution as magnesium sulfate and heating the resulting magnesium sulfate to convert it into magnesium oxide, and the method cannot be said to be an economical method.

Further, there is also proposed a method of using an oxide ore having a high magnesium content (limonite ore) as a neutralizing agent.

For example, Japanese Patent No. 4294685 discloses a method of recovering nickel or cobalt from an oxide ore containing nickel or cobalt and iron, the method comprising: a step of providing a first oxide ore and a second oxide ore having a higher magnesium content than the first oxide; a classification step of classifying the first oxide ore to a first small particle size oxide ore and a first large particle size oxide ore and classifying the second oxide ore to a second small particle size oxide ore and a second large particle size oxide ore; a leaching step of leaching nickel or cobalt from the first large particle size oxide ore with sulfuric acid to obtain a sulfuric acid leach solution containing nickel or cobalt and a leach residue from the first large particle size oxide ore; a reaction step of mixing the sulfuric acid leach solution containing the leach residue and the second large particle size oxide ore to allow the sulfuric acid leach solution and magnesium contained in the second large particle size oxide ore to react with each other and adjusting the pH of the reaction mixture to obtain a reaction mixture containing nickel or cobalt and a reaction residue containing iron; and a neutralization step of neutralizing the reaction mixture containing the reaction residue with a neutralizing agent to obtain a neutralized solution containing nickel or cobalt and a neutralization residue containing iron.

The nickel oxide ore itself can be utilized as a neutralizing agent by using this method.

However, the cost and the time and efforts for classifying ores have not been able to be ignored. Further, a high level of gangue component is present in the leach residue, and when the leach residue is used as it is, the iron grade will be low. Thus, it has not been an efficient raw material.

Therefore, it has been difficult to replace the whole amount of the neutralizing agent used in the HPAL process with magnesium oxide.

Further, a method is easily remembered in which the neutralizing agent is replaced with magnesium oxide derived from a base rock only in a preliminary neutralization step of producing a leach residue to prevent the mixing of sulfur.

However, when a conventional calcium-based neutralizing agent is used in a neutralization step to utilize the technique of improving the efficiency of real operation described in Japanese Patent Laid-Open No. 2004-225120, the residue from the neutralization step will be returned to CCD. Therefore, the mixing of sulfur into the leach residue cannot be avoided, and a new problem of causing an increase in sulfur impurity will arise.

In such a situation, the present invention provides a method for producing hematite from a leach residue containing fine iron oxide produced in the HPAL process, firstly the method allowing the use of conventional Ca-based neutralizing agents and neutralizing agents, other than Ca-based neutralizing agents, which are derived from a base rock, in real operation of refining hematite to obtain hematite containing a low level of sulfur component to such an extent that the hematite can be used as a raw material for ironmaking, and secondly the method allowing the sintering of very fine powder ore which has not conventionally been used.

SUMMARY

A first aspect of the present invention to solve the above problems is a method for producing (high purity) hematite for ironmaking in a process where a mineral acid and an oxidizing agent are added to an ore containing iron and a valuable metal and then the valuable metal is leached at high temperatures and high pressures, the method including the steps of:

(1) a high pressure acid leach step of adding the mineral acid and the oxidizing agent to the ore and leaching the valuable metal contained in the ore under high temperatures and high pressures to obtain a leachate and then adding a neutralizing agent to the leachate for neutralization treatment to form a leach slurry;

(2) a preliminary neutralization step of adding a neutralizing agent to the leach slurry for neutralization treatment to form a slurry after the preliminary neutralization including a nickel-enriched component and an iron-enriched component that have been separated by the neutralization treatment;

(3) a first solid-liquid separation step of subjecting the slurry after the preliminary neutralization formed by the preliminary neutralization step (2) to solid-liquid separation to separate the slurry into a nickel-enriched slurry (liquid component) and an iron-enriched slurry (solid component) with washing;

(4) a first neutralization step of neutralizing the nickel-enriched slurry obtained by the first solid-liquid separation step (3) using a calcium-based neutralizing agent;

(5) a second neutralization step of neutralizing the iron-enriched slurry obtained by the first solid-liquid separation step (3) using a non-calcium-based neutralizing agent;

(6) a third solid-liquid separation step of subjecting the iron-enriched slurry after the neutralization produced through the second neutralization step (5) to solid-liquid separation and washing to produce hematite as a solid component;

(7) seed crystal addition treatment of adding, as seed crystals, a part of the iron-enriched slurry obtained in the first solid-liquid separation step (3) to the first neutralization step (4) of neutralizing the nickel-enriched slurry;

(8) a second solid-liquid separation step of subjecting a precipitate obtained from the first neutralization step (4) using the nickel-enriched slurry to solid-liquid separation to separate the precipitate into a residue (solid component) containing a sulfur compound and a liquid component which does not contain sulfur with washing: and (9) a baking step of baking the hematite obtained in the third solid-liquid separation step (6) at 1150 to 1350° C.

The amount of the iron-enriched slurry added as seed crystals in the seed crystal addition treatment may be 50% to 80% by weight with respect to the amount of the precipitate produced by neutralization in the first neutralization step (4) in terms of a weight ratio.

The neutralizing agent added to the leachate in the high pressure acid leach step and/or in the preliminary neutralization step may be a base rock or magnesium hydroxide.

The neutralizing agent used in the second neutralization step may be sodium hydroxide or potassium hydroxide.

The neutralizing agent used in the first neutralization step (may be limestone or slaked lime.

The ore containing iron and a valuable metal may be nickel oxide ore.

After the third solid-liquid separation step, the method may further comprise subjecting the hematite to a moisture content adjustment step (10) of removing water from the hematite as a solid component obtained in the third solid-liquid separation step to bring the moisture percentage of hematite after water removal to 10% by weight to 17% by weight (hereinafter, the unit of moisture percentage is represented by "%") and then baked in the baking step.

The particle size (d50) of the hematite obtained in the third solid-liquid separation step may be less than 1 μm.

The particle size (d50) of the hematite baked body obtained in the baking step may be 3 to 20 mm.

The method for producing hematite for ironmaking of the present invention firstly allows a combined use of conventional Ca-based neutralizing agents and non-Ca-based neutralizing agents, other than Ca-based neutralizing agents, which are derived from a base rock, in real operation of refining hematite to obtain hematite containing a low level of sulfur component to such an extent that the hematite can be used as a raw material for ironmaking, from a leach residue containing fine iron oxide produced in the HPAL process. The method secondly allows the sintering of very fine powder ore which has not conventionally been used. Accordingly, the method generates a remarkable effect on industry.

DETAILED DESCRIPTION

The present invention comprises a method for producing (high purity) hematite for ironmaking in a production process where a mineral acid and an oxidizing agent are added to an ore containing iron and a valuable metal and then the valuable metal is leached under high temperatures and high pressures, the method comprising the following treatments (1) to (9):

(1) a high pressure acid leach step of adding the mineral acid and the oxidizing agent to the ore and leaching the valuable metal contained in the ore under high temperatures and high pressures to obtain a leachate and then adding a neutralizing agent to the leachate for neutralization treatment to form a leach slurry;

(2) a preliminary neutralization step of adding a neutralizing agent to the resulting leach slurry for neutralization treatment to form a slurry after the preliminary neutralization which is separated into a Ni-enriched component and an Fe-enriched component;

(3) a first solid-liquid separation step of subjecting the slurry after preliminary neutralization formed by the (2) preliminary neutralization step to solid-liquid separation to separate the slurry into a Ni-enriched slurry (liquid component) and an Fe-enriched slurry (solid component) with washing;

(4) a first neutralization step of neutralizing the Ni-enriched slurry obtained by the (3) first solid-liquid separation step using a Ca-based neutralizing agent;

(5) a second neutralization step of neutralizing the Fe-enriched slurry obtained by the (3) first solid-liquid separation step using a non-Ca-based neutralizing agent;

(6) a third solid-liquid separation step of subjecting the Fe-enriched slurry after neutralization produced through the (5) second neutralization step to solid-liquid separation and washing to produce hematite as a solid component;

(7) seed crystal addition treatment of adding, as seed crystals, a part of the Fe-enriched slurry obtained in the (3) first solid-liquid separation step to the (4) first neutralization step of neutralizing the Ni-enriched slurry;

(8) a second solid-liquid separation step of subjecting a precipitate obtained from the (4) Ni-enriched slurry first neutralization step to solid-liquid separation to separate the precipitate into a residue (solid component) containing a sulfur compound and a liquid component which does not contain sulfur, with washing: and (9) a baking step of baking the hematite obtained in the (6) third solid-liquid separation step at 1150 to 1350° C.

Further, hematite may be subjected to a step (10) and then baked in the step (9), the step (10) being: (10) a moisture content adjustment step of removing water from the hematite as a solid component obtained in the (6) third solid-liquid separation step to bring the moisture percentage of hematite after water removal to 10% to 17%.

Hereinafter, the present invention will be described in detail with reference to drawings.

Figure 1:
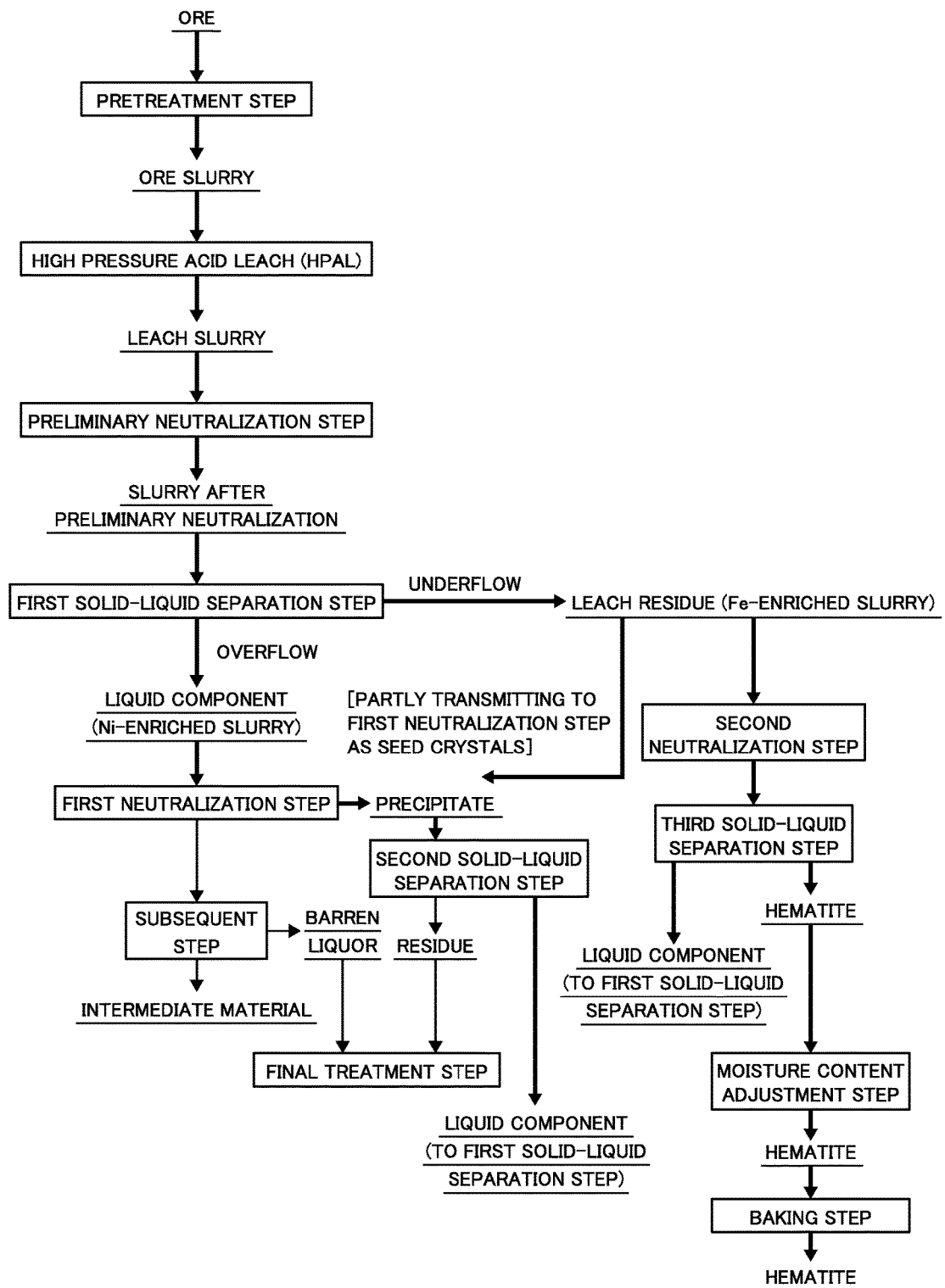
FIG. 1 is a flow chart of production steps of the present invention.

FIG. 1 is a flow chart of production steps of the present invention.

The valuable metal contained in an ore is produced according to the flow shown by solid-line arrows (thin solid-line arrows from the neutralization step) on the leftmost side of FIG. 1.

On the other hand, as shown by thick solid-lines of FIG. 1, hematite which is a by-product of this production process is contained in a leach residue (Fe-enriched slurry) obtained at the head of the thick solid-line arrow branched on the right side from a first solid-liquid separation step (CCD), and then produced according to the flow shown by the thick solid-line arrows on the rightmost side of FIG. 1. Hereinafter, each step will be described in detail.

[Neutralization Treatment]

The neutralization treatment in the present invention is performed in the three steps of "1. Preliminary neutralization step", "2. First neutralization step", and "3. Second neutralization step". The neutralizing agent used in each step is described below.

A base rock, magnesium oxide, or magnesium hydroxide is used as the neutralizing agent in the preliminary neutralization step.

A Ca-based neutralizing agent can be used as the neutralizing agent in the first neutralization step, and inexpensive limestone and slaked lime are used.

A non-Ca-based neutralizing agent is used as the neutralizing agent in the second neutralization step, and sodium hydroxide and potassium hydroxide are used. However, magnesium hydroxide and magnesium oxide may also be used.

Each neutralization step will be described.

1. Preliminary Neutralization Step

In the preliminary neutralization step of the present invention, neutralization is advanced while suppressing the mixing of calcium by first using, as a neutralizing agent, a base rock, a representative example of the component composition thereof being shown in Table 1 (unit: % by weight). In the case of the refining of nickel oxide ores, the target pH after neutralization is a pH of about 1 to 3 in order to improve the separation efficiency in the next first solid-liquid separation step.

in which an inexpensive Ca-based neutralizing agent such as limestone and slaked lime is used. This allows the operation with stability and low cost. In the case of the refining of nickel oxide ore, the target pH after neutralization is a pH of about 3 to 5 in order to improve the separation efficiency of impurities in a subsequent step.

The solids which are neutralized and separated in this step are sent to the second solid-liquid separation step in the state of slurry from the bottom of a neutralization tank. However, the solids have a disadvantage that they are in the state of a fine precipitate since gypsum is the main component and have a small settling velocity in the neutralization tank, and the solid percentage of the settled precipitate is not sufficiently increased.

Therefore, in order to improve the settling velocity, a part of the Fe-enriched slurry (hematite is the main component) of the leach residue which is the underflow of the first solid-liquid separation step (CCD) is preferably added as seed crystals. The weight of the solids in the addition is preferably in the range of 50% by weight or more and 80% by weight or less of the weight of the precipitate.

If the weight of the solids is less than 50% by weight, the solids cannot play a role of seed crystals, and an increase in settling velocity is insufficient; and if the weight of the solids is more than 80% by weight, the effect of increasing settling velocity will not be much changed, and the production volume of hematite obtained by treating the Fe-enriched slurry will be reduced. Therefore, the weight of the solids in these ranges is disadvantageous.

3. Second Neutralization Step

In the second neutralization step of neutralizing the leach residue (Fe-enriched slurry), magnesium hydroxide, whose supply is unstable, is not used, but sodium hydroxide and potassium hydroxide are preferably used.

Further, if magnesium hydroxide is used as a neutralizing agent, the amount of Mg in a drain will be increased, and a large amount of neutralizing agent will be required in the final Mg-solidification treatment. Therefore, the use of magnesium hydroxide as a neutralizing agent is not preferred.

The target pH after neutralization is a pH of about 6 to 8 since this is the final neutralization step for hematite.

[Solid-Liquid Separation Treatment]

Next, the solid liquid separation treatment in the present invention is performed in three treatments of "first solid-liquid separation step", "second solid-liquid separation step", and "third solid-liquid separation step".

1. First Solid-Liquid Separation Step

The first solid-liquid separation step is performed using a known method such as CCD (Counter Current Decantation), in which a slurry after preliminary neutralization, which is separated into a Ni-enriched component and an Fe-enriched component, formed by the neutralization in the preliminary neutralization step is separated into a Ni-enriched slurry (liquid component) and an Fe-enriched slurry (solid component: leach residue).

TABLE 1

|  | Ni | Fe | Co | Si | Mg | Cr | Al | Mn | Ca | S |
|---|---|---|---|---|---|---|---|---|---|---|
| Base rock | 0.22 | 4.92 | <0.02 | 17.4 | 22.1 | 0.26 | 0.13 | 0.09 | 0.08 | <0.05 |

Unit: % by weight

2. First Neutralization Step

This step is a first neutralization step of subjecting the liquid component (Ni-enriched slurry) obtained from the first solid-liquid separation step to neutralization treatment, Here, the Ni-enriched slurry is an overflow liquid (supernatant liquid) obtained from CCD, and it is called a slurry for convenience since a small amount of solids is mixed into the liquid.

The Ni-enriched slurry is treated by a subsequent step to form an intermediate material, such as a nickel/cobalt mixed sulfide and a nickel sulfate solution, which is further refined to form a valuable metal.

On the other hand, iron oxide for ironmaking (high purity hematite) is recovered from the Fe-enriched slurry as a leach residue through the second neutralization step and the third solid-liquid separation step according to the flow shown by thick solid-line arrows on the rightmost side of FIG. 1.

Note that the solid-liquid separation method used for the first solid-liquid separation step is a solid-liquid separation method, such as the CCD method, in which a material (here, refers to the slurry after preliminary neutralization) is contained in a carrier fluid (here, refers to a washing liquid) and transported. The method is preferred in that a washing liquid created in the production process can be used, which is preferred also in terms of saving resources, and the sulfur impurity in the hematite produced can be reduced. In the first solid-liquid separation step, the CCD method is particularly suitable.

2. Second Solid-Liquid Separation Step

The second solid-liquid separation step is performed using a known method such as CCD (Counter Current Decantation), in which a liquid component is recovered from a slurry of the precipitate essentially comprising gypsum obtained from the first neutralization step as a washing liquid for the first solid-liquid separation step, and a residue (solid component) is sent to a final treatment step.

The provision of the second solid-liquid separation step allows the washing liquid from which gypsum is removed to be used as a washing liquid for use in the first solid-liquid separation step of producing the Fe-enriched slurry. As a result, gypsum is not mixed into the separated Fe-enriched slurry, and the sulfur impurity of the resulting hematite can be suppressed. Further, the amount of a washing liquid to be newly prepared can also be reduced.

3. Third Solid-Liquid Separation Step

The third solid-liquid separation step is performed using a known method such as wet classification, thickener, and filter press, in which hematite having a sulfur content of less than 1% is recovered as solids from the Fe-enriched slurry after neutralization obtained from the second neutralization step. Further, the resulting liquid component is recovered as a washing liquid for the first solid-liquid separation step.

Note that when excess acid in a leach slurry is neutralized using a base rock, a leach residue (hereinafter, referred to as a neutralization residue in order to distinguish) after passing through the first solid-liquid separation step is preferably classified using a wet cyclone or the like (wet classification). Thereby, hematite is concentrated on the small particle size side of the neutralization residue (for example, the overflow; O/F side of the wet cyclone), and a material other than hematite is concentrated on the large particle size side (the underflow: U/F side of the wet cyclone), thereby increasing the hematite grade.

Figure 2:
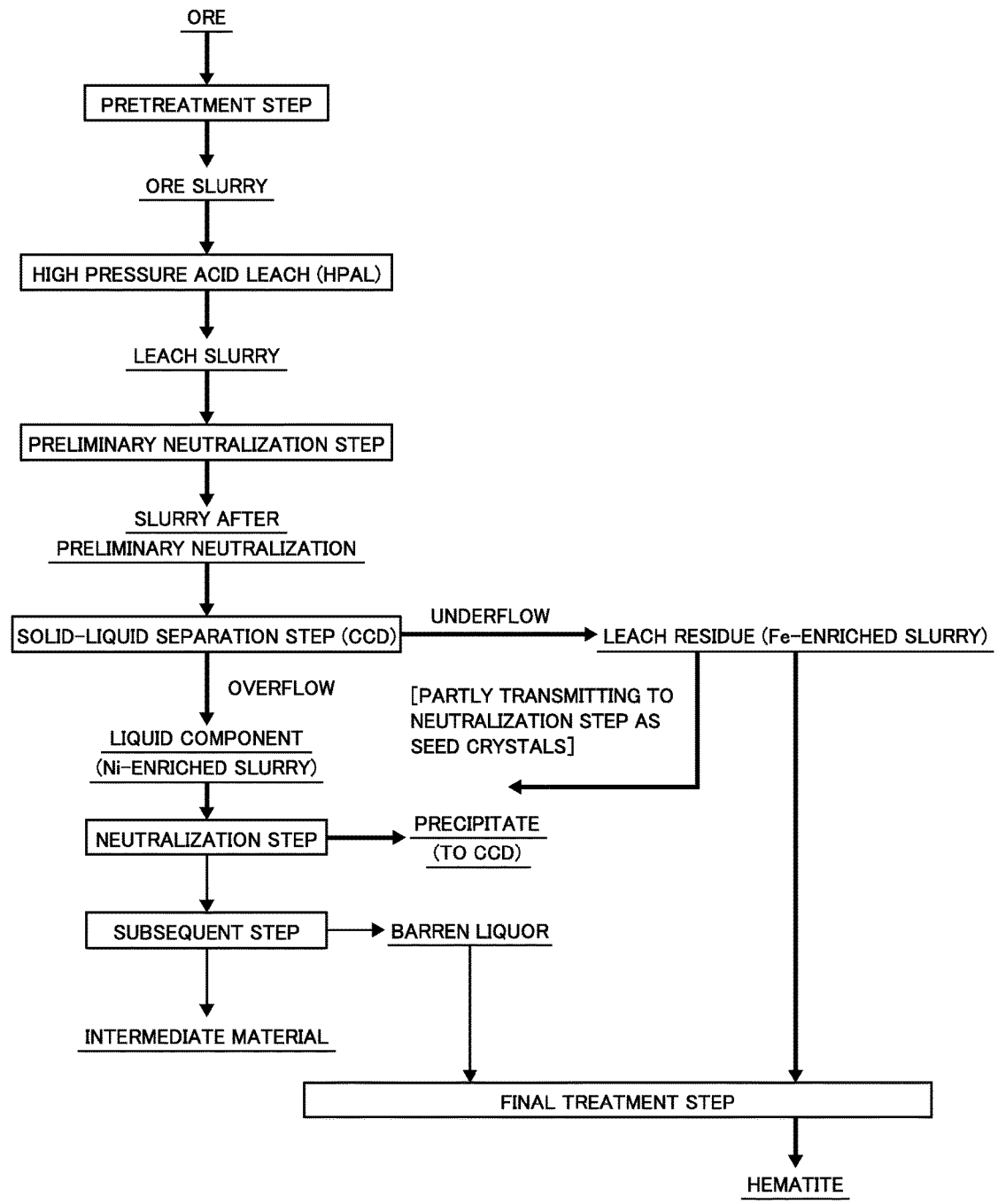
FIG. 2 is a flow chart of conventional production steps.

As described above, when the Fe-enriched slurry is added to the neutralization step and the precipitate which is a residue produced in the neutralization step is returned to CCD (refer to a flow chart of conventional production steps in FIG. 2) in order to improve the operation efficiency in real operation, only hematite containing about 5 to 8% of sulfur has been able to be obtained. However, hematite having a sulfur content of less than 1% has been able to be obtained by applying the present invention.

On the other hand, a hematite cake (shown as "hematite" in FIG. 1) obtained in the third solid-liquid separation step in the production method of the present invention has a low sulfur content of less than 1% but a relatively high moisture content of 22%.

Generally, in the transportation of solid matter, if it has a high moisture content, it may cause liquefaction during transportation by ship to cause an overturn of a ship. As a result of investigation by Japan Marine Surveyors and Sworn Measurers' Association, the transportable moisture limit (TML) of the hematite of the present invention has been 17% or less. Therefore, when the hematite is transported by ship, it is necessary to reduce the moisture content of the cake. Further, since the hematite has a very fine particle size of about 1 μm, the possibility of raising dust is very high.

The raising dust tends to be reduced by increasing the moisture percentage, but when the moisture percentage is reduced from 17%, fine particles tend to significantly increase at about 10% or less. Therefore, the moisture percentage is preferably 10 to 17%. When the raising dust can be prevented, for example, by using a flexible container during handling, a lower moisture content is preferred.

Therefore, it is preferred to perform a moisture adjustment step of adjusting the moisture content. In the present invention, dehydration of removing water from the hematite cake is performed.

The dehydration method includes a heating method, a filter press method, and a centrifuge separation method, but a method using a filter press (pressure filtration) is widely used in terms of high water removal efficiency and economic efficiency.

However, the resulting hematite is in the form of very fine particles. Therefore, although even the hematite in which the moisture content is adjusted can be used as a raw material for ironmaking, it can be used only in a small amount because the hematite still in the form of very fine particles will easily cause clogging in a blast furnace.

Therefore, the hematite cake obtained from the hematite production step of the present invention which is in the form of very fine particles is baked to form coarse particles.

The hematite obtained by the production method of the present invention has an average particle size of 1 μm or less. If the hematite having the above particle size is used as a raw material for ironmaking, it will cause clogging during the charge thereof into a blast furnace. Since this hematite is formed from very fine particles having an average particle size of 1 μm or less, it is easily sintered in the baking of hematite, and a sintering aid such as lime, which has been added during baking, is not required.

Therefore, if the average particle size of the resulting hematite is more than 1 such hematite is not preferred since the strength of the baked body obtained after the baking of such hematite is reduced.

The baking of hematite can be easily performed at a temperature of 1150 to 1350° C. without adding a sintering aid such as lime, and the density of the resulting hematite baked body is 4.0 g/cc to 5.0 g/cc.

If the baking temperature of hematite is less than 1150° C., the density of the hematite baked body will be less than 4.0 g/cc. If the density is 4.0 g/cc or less, the number of holes in the baked body will increase to produce cracks in the baked body, causing the baked body to be brittle.

On the other hand, if the baking temperature is higher than 1350° C., the density will exceed 5.0 g/cc. If the density exceeds 5.0 g/cc, it will be difficult for a reducing gas to enter into the baked body, and the reduction efficiency of the reducing gas will be reduced. Therefore, such density is not preferred.

Note that a large portion of sulfur remaining in the above hematite cake is not derived from gypsum but is probably derived from a sulfuric acid component incorporated into the hematite particles in the step of high pressure acid leach, and substantially the total amount of sulfur derived from gypsum can be removed by applying the present invention.

Next, the baking is followed by a crushing step to obtain a particle size (d50) of 3 to 20 mm. If the particle size (d50) is less than 3 mm, the particle size will cause clogging in a blast furnace, reducing the flow of reducing gas. On the other hand, if the particle size exceeds 20 mm, reaction time will be increased to cause the deterioration of productivity.

Further, the particle size of a base rock used for preliminary neutralization treatment is preferably adjusted to the optimum range by crushing or the like.

Specifically, when the particle size of a base rock is in a range that does not exceed 500 µm, there will be no difference in neutralization performance, and when a wet cyclone is used for classification, the accuracy of classification can be increased with an increase in the particle size of a material which is intended to be removed by classification. Therefore, when the particle size of a base rock is adjusted to a range of 500 µm or less, preferably to an average particle size of around 150 µm in consideration of an equipment load, the components other than hematite such as vein stone can be distributed to the U/F side, and the grade of hematite can be improved.

EXAMPLES

Hereinafter, the present invention will be described in more detail with reference to Examples and Comparative Examples. Conditions common to Examples and Comparative Examples are shown in Table 2 below.

TABLE 2

Raw material ore: nickel oxide ore having a nickel grade of 1% and an iron grade of 46 to 48%.
Ore slurry: pretreated to a 30 to 40% by weight slurry.
High pressure acid leach: a slurry mixed with 98% by weight of sulfuric acid was charged into a pressure device and heated to 250 to 290° C. followed by maintaining the temperature for 1 hour to leach nickel in an ore.
Neutralizing agent in preliminary neutralization step: a base rock (<about 300 to 400 µm) was used.
Neutralizing agent in first neutralization step: slaked lime was used.
Amount of Fe-enriched slurry added to first neutralization step: set at 70% of the amount of precipitate produced.

Note that the moisture percentage was measured with a heating and drying method moisture meter "ML-50" (manufactured by A&D Company, Limited), and the sulfur impurity was measured using a carbon and sulfur analyzer.

The particle size was measured with a size distribution measuring device "Model SALD-3100" (manufactured by SHIMADZU CORPORATION).

A hearth rise and fall type high temperature furnace (manufactured by MARUSHO DENKI CO., LTD.) was used as a sintering furnace. The temperature of a sintering material was measured with a thermocouple, and after the temperature reached a predetermined sintering temperature, the sintering temperature was kept for a predetermined period of time.

Example 1

The second solid-liquid separation step (CCD), the third solid-liquid separation step (filter press), and the second neutralization step (neutralizing agent: sodium hydroxide) were performed according to the flow of the production steps according to the present invention shown in FIG. 1. Particularly, the operation was performed without returning the precipitate obtained from the first neutralization step to the first solid-liquid separation step.

As a result, hematite having a hematite sulfur impurity of 0.9%, an average particle size of 0.6 µm, and a moisture percentage of 22% was able to be obtained.

Since the settling of the precipitate was accelerated by adding the Fe-enriched slurry to the first neutralization step, the operation was achieved at the same efficiency as before.

The resulting hematite cake (10 cm×20 cm×1 cm) was baked at 1350° C. for 10 minutes. Next, the baked cake was crushed using a jaw crusher.

The resulting baked body had a sulfur impurity of 0.01% and a moisture percentage of 0%. Further, the baked body had a density of 5.0 g/cc and a particle size (d50) of 3 mm.

Example 2

The second solid-liquid separation step (CCD), the third solid-liquid separation step (filter press), and the second neutralization step (neutralizing agent: sodium hydroxide) were performed according to the flow of the production steps according to the present invention shown in FIG. 1. Particularly, the operation was performed without returning the precipitate obtained from the first neutralization step to the first solid-liquid separation step.

The resulting hematite cake was subjected to high pressure filter press (high pressure heating filtration apparatus), thereby obtaining hematite having a hematite sulfur impurity of 0.9%, a hematite average particle size of 0.6 µm, and a moisture percentage of 13%.

The resulting hematite cake (10 cm×20 cm×1 cm) was baked at 1350° C. for 10 minutes. Next, the baked cake was crushed using a jaw crusher.

The resulting baked body had a sulfur impurity of 0.01% and a moisture percentage of 0%. Further, the baked body had a density of 5.0 g/cc and a particle size (d50) of 20 mm.

Example 3

The second solid-liquid separation step (CCD), the third solid-liquid separation step (filter press), and the second neutralization step (neutralizing agent: sodium hydroxide) were performed according to the flow of the production steps according to the present invention shown in FIG. 1. Particularly, the operation was performed without returning the precipitate obtained from the first neutralization step to the first solid-liquid separation step. The resulting hematite had an average particle of 0.6 µm.

The resulting hematite cake was subjected to high pressure filter press (high pressure heating filtration apparatus), thereby obtaining hematite having a hematite sulfur impurity of 0.9% and a moisture percentage of 13%.

The resulting hematite cake (10 cm×20 cm×1 cm) was baked at 1150° C. for 10 minutes. Next, the baked cake was crushed using a jaw crusher.

The resulting baked body had a sulfur impurity of 0.07% and a moisture percentage of 0%. Further, the baked body had a density of 4.3 g/cc and a particle size (d50) of 20 mm.

Comparative Example 1

The present invention was not applied. The operation was performed by returning the precipitate obtained from the neutralization step to CCD (solid-liquid separation step) as shown in the flow chart of production steps in FIG. 2.

As a result, the sulfur impurity of the resulting hematite was 6.5%, and hematite which is used with difficulty as a raw material for ironmaking was only obtained.

Comparative Example 2

The second solid-liquid separation step (CCD), the third solid-liquid separation step (filter press), and the second neutralization step (neutralizing agent: sodium hydroxide) were performed according to the flow of the production steps according to the present invention shown in FIG. 1. Particularly, the operation was performed without returning the precipitate obtained from the first neutralization step to the first solid-liquid separation step.

The resulting hematite had a sulfur impurity of 0.9%, an average particle size of 0.6 μm, and a moisture percentage of 22%.

The resulting hematite cake (10 cm×20 cm×1 cm) was baked at 1400° C. for 10 minutes. Next, the baked cake was crushed using a jaw crusher.

The resulting baked body had a sulfur impurity of 0.01% and a moisture percentage of 0%. Further, the baked body had a density of 5.2 g/cc and a particle size (d50) of 20 mm.

Comparative Example 3

The second solid-liquid separation step (CCD), the third solid-liquid separation step (filter press), and the second neutralization step (neutralizing agent: sodium hydroxide) were performed according to the flow of the production steps according to the present invention shown in FIG. 1. Particularly, the operation was performed without returning the precipitate obtained from the first neutralization step to the first solid-liquid separation step.

The resulting hematite had a sulfur impurity of 0.9%, an average particle size of 0.6 μm, and a moisture percentage of 22%.

The resulting hematite cake (10 cm×20 cm×1 cm) was baked at 1050° C. for 10 minutes. Next, the baked cake was crushed using a jaw crusher.

The resulting baked body had a sulfur impurity of 0.2% and a moisture percentage of 0%. Further, the baked body had a density of 3.8 g/cc and a particle size (d50) of 20 mm.

The invention claimed is:

1. A method for producing hematite for ironmaking by a process where a mineral acid and an oxidizing agent are added to an ore containing iron and a valuable metal and then the valuable metal is leached at high temperatures and high pressures, the method comprising the steps of:
    (1) a high pressure acid leach step of adding the mineral acid and the oxidizing agent to the ore and leaching the valuable metal contained in the ore under high temperatures and high pressures to obtain a leachate and then adding a neutralizing agent to the leachate for neutralization treatment to form a leach slurry;
    (2) a preliminary neutralization step of adding a neutralizing agent to the leach slurry to form a slurry including a nickel-enriched component and an iron-enriched component;
    (3) a first solid-liquid separation step of subjecting the slurry formed by the preliminary neutralization step (2) to solid-liquid separation to separate the slurry into a nickel-enriched slurry and an iron-enriched slurry;
    (4) a first neutralization step of neutralizing the nickel-enriched slurry using a calcium-based neutralizing agent;
    (5) a second neutralization step of neutralizing the iron-enriched slurry using a non-calcium-based neutralizing agent;
    (6) a third solid-liquid separation step of subjecting the iron-enriched slurry after the second neutralization step (5) to solid-liquid separation and washing to produce hematite as a solid component;
    (7) seed crystal addition treatment of adding, as seed crystals, a part of the iron-enriched slurry obtained in the first solid-liquid separation step (3) to the first neutralization step (4);
    (8) a second solid-liquid separation step of subjecting a precipitate obtained from the first neutralization step (4) using the nickel-enriched slurry to solid-liquid separation to separate the precipitate into a residue containing a sulfur compound and a liquid component which does not contain sulfur; and
    (9) a baking step of baking the hematite produced in the third solid-liquid separation step (6) at 1150 to 1350°C.

2. The method for producing hematite for ironmaking according to claim 1, wherein an amount of the iron-enriched slurry added as seed crystals in the treatment (7) is 50% to 80% by weight with respect to an amount of a precipitate produced by neutralization in the first neutralization step (4).

3. The method for producing hematite for ironmaking according to claim 1, wherein the neutralizing agent added to the leachate in the steps of (1) and (2) is a base rock or magnesium hydroxide.

4. The method for producing hematite for ironmaking according to claim 1, wherein the neutralizing agent used in the second neutralization step (5) is sodium hydroxide or potassium hydroxide.

5. The method for producing hematite for ironmaking according to claim 1, wherein the neutralizing agent used in the first neutralization step (4) is limestone or slaked lime.

6. The method for producing hematite for ironmaking according to claim 1, wherein the ore containing iron and a valuable metal is nickel oxide ore.

7. The method for producing hematite for ironmaking according to claim 1, further comprising a step (10) after the step (6), the step (10) being:
    (10) a moisture content adjustment step of removing water from the hematite as a solid component obtained in the third solid-liquid separation step (6) to bring the moisture percentage of hematite after water removal to 10% to 17% by weight.

8. The method for producing hematite according to claim 1, wherein a particle size (d50) of the hematite obtained in the third solid-liquid separation step (6) is less than 1μm.

9. The method for producing hematite according to claim 1, wherein a particle size (d50) of the baked hematite is 3 to 20 mm.

* * * * *